A. RIEDLER.
CRANK SHAFT.
APPLICATION FILED JULY 7, 1917.
1,254,159.
Patented Jan. 22, 1918.
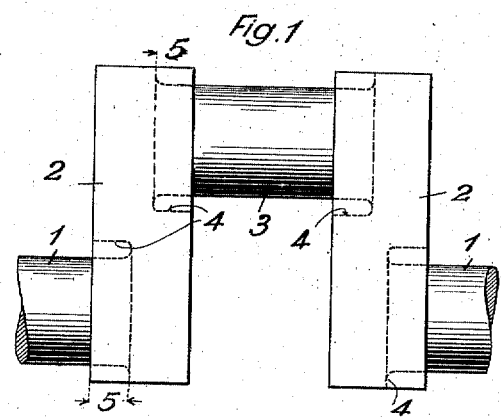
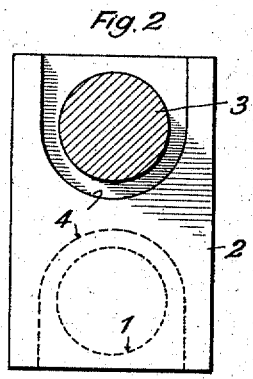
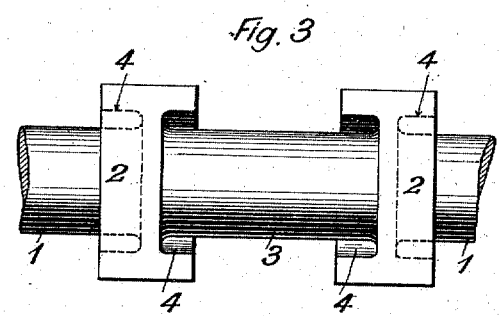
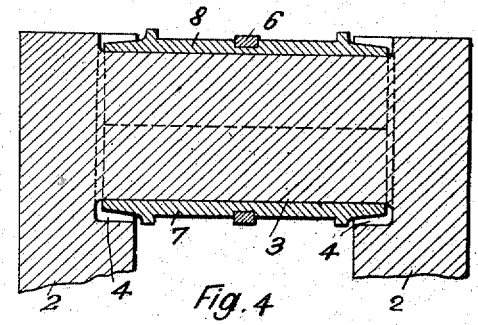
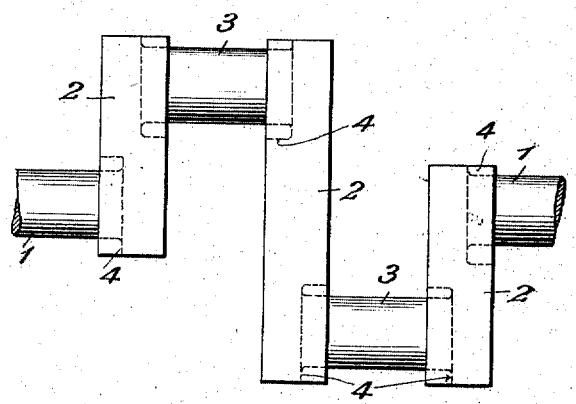
Inventor:
Alois Riedler
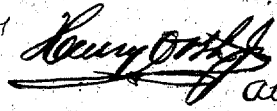
Atty.

UNITED STATES PATENT OFFICE.

ALOIS RIEDLER, OF BERLIN, GERMANY.

CRANK-SHAFT.

1,254,159. Specification of Letters Patent. Patented Jan. 22, 1918.

Application filed July 7, 1917. Serial No. 179,216.

*To all whom it may concern:*

Be it known that I, Dr. ALOIS RIEDLER, a subject of the Emperor of Germany, residing at No. 7, Rauchstrasse, Berlin, Germany, have invented certain new and useful Improvements in Crank-Shafts; and I do hereby declare the following to be a clear, full, and exact description of the invention, such as will enable others skilled in the art to which it appertains to make and use the same, reference being had to the accompanying drawing, and to letters or figures of reference marked thereon, which form a part of this specification.

The present invention has reference to certain new and useful improvements in crank shafts, and relates more particularly to a cranked shaft, whose crank portion proper, of right-angle design, is of relatively narrow construction without the bearing surfaces being unduly shortened.

It has been proposed in prior art to obtain this reduction in longitudinal extent by slantingly directing the crank arms or webs toward one another; but such converging crank arms are stressed rather unfavorably and for this reason must be made comparatively wide. In engines with small crank radius a crank with such converging webs can not be used, for the reason that the space between journal and crank pin is insufficient to accommodate a sufficiently wide crank arm of slanting extent.

In one-armed crank shafts the distance between the crank arm and the center of the connecting rod has been reduced by providing an annular, closed recess in the crank arm about the crank pin; but this construction is not suitable for cranked shafts, for the reason that the ordinary two-part journal bearings or brasses can not be introduced into the oppositely disposed, closed recesses of the respective two crank webs. The use of such allround closed recesses in cranked shafts requires obviously, the employment of multipart bearings.

According to this invention this drawback is effectively obviated. My new construction of recess is such that the ordinary two-part bearings or brasses can readily be used, and that at the same time the length of the crank shaft including the rectangular cranked portion can be materially reduced. The recesses in the crank webs are substantially horse-shoe-shaped and are provided on the broad side faces of the webs in such manner that their open ends face oppositely outwardly in the longitudinal axis of the webs. By this arrangement the crank arms are given a favorable stress cross-section and can be made rather strong, while the smallest size web, as regards the depth of recess, even when their side faces are parallel, is wider by the depth of the second recess of the same web than in prior constructions of such cranks.

In the accompanying drawing

Figure 1 shows side elevation of a crank according to my invention,

Fig. 2 a cross-section therethrough;

Fig. 3 represents a plan view of a double-arm crank, and

Fig. 4 a longitudinal section therethrough;

Fig. 5 shows a side elevation of a two-throw crank construction.

The crank shaft comprises in the usual manner the journals 1, the crank arms or webs 2, and the crank pin 3. The webs are shown as being parallelly disposed, resulting in a rectangular crank portion.

The reduction in the longitudinal extent is obtained by providing the crank webs on either side face with approximately horseshoe-shaped recesses 4, surrounding the respective journal or pin ends, into which engage the bearings or brasses.

In a two-arm crank with such recesses 4 (each of the depth 5), a reduction is obtained equal to the sum of the depths of the four recesses. The bending moments under otherwise equal stresses will become smaller. The crank arms, provided with such recesses 4, show a favorable U-cross-section, with raised web and wide flanges, as clearly shown in Fig. 3, which cross-section gradually merges into the solid cross-section. On the respectively opposite crank arm faces the arm cross-section may be enlarged as required.

This conformation of recess allows of the bearings or brasses being readily mounted on the journals and pins, by first emplacing one bearing half 7 through the open ends of the facing recesses 4 and by then turning it about the pin through 180°, and by finally laying on the other bearing half 8.

In multi-throw crank shafts with relatively displaced cranks the mounting of the shaft in the bearings is facilitated by first placing the brasses about the several pins and holding them together in radial and axial sense by means of expansion rings 6, as shown in Fig. 4. The crank shaft with the bearing members thus in place can then readily be mounted in its case.

Fig. 5 shows my invention in connection with a two-throw crank construction. In multi-throw crank shafts the advantages set forth above, obviously, will still more be apparent, and the reduction of the shaft length will grow proportionately.

What I claim is:

1. A shaft having a substantially rectangular crank portion, the crank arms of said portion having open ended recesses in the side faces thereof, said recesses extending about the crank journals and pin, for the purpose specified.

2. A shaft comprising two journal portions, a crank arm on each portion, and a crank pin connecting the arms, the side faces of the latter having open ended recesses extending about said pin and journal portions, for the purpose specified.

3. A crank shaft comprising two parallel crank arms and a crank pin connecting the latter, the side faces of said arms having U-shaped recesses extending in opposite directions about the shaft and pin, for the purpose specified.

4. A crank shaft comprising two parallel crank arms and a crank pin connecting the latter, the side faces of said arms having U-shaped recesses extending longitudinally of the arms about the shaft and pin in opposite directions, for the purpose specified.

In testimony that I claim the foregoing as my invention, I have signed my name.

Dr. ALOIS RIEDLER.